United States Patent [19]
Glover

[11] Patent Number: 6,068,335
[45] Date of Patent: May 30, 2000

[54] RETAINER

[75] Inventor: Richard Glover, Greenwood, Ind.

[73] Assignee: Cosco, Inc., Columbus, Ind.

[21] Appl. No.: 09/151,791

[22] Filed: Sep. 11, 1998

Related U.S. Application Data

[60] Provisional application No. 60/058,542, Sep. 11, 1997.
[51] Int. Cl.$^7$ ........................................................ A47C 1/08
[52] U.S. Cl. ........................................ 297/256.15; 297/488
[58] Field of Search ............................ 297/250.1, 256.15, 297/487, 488, 463.1, 440.1; 29/428; 403/348, 349; 16/249, 253, 261

[56] References Cited

U.S. PATENT DOCUMENTS

| | | |
|---|---|---|
| D. 339,477 | 9/1993 | Kain . |
| 3,778,102 | 12/1973 | Snyder et al. . |
| 4,429,916 | 2/1984 | Hyde et al. . |
| 4,738,489 | 4/1988 | Wise et al. . |
| 4,858,997 | 8/1989 | Shubin . |
| 4,912,818 | 4/1990 | Meeker . |
| 5,005,903 | 4/1991 | Minardi . |
| 5,318,346 | 6/1994 | Roossien et al. . |

FOREIGN PATENT DOCUMENTS

| | | | |
|---|---|---|---|
| 2728133 | 5/1979 | Germany | 403/349 |
| 292665 | 6/1928 | United Kingdom | 403/349 |

*Primary Examiner*—Milton Nelson, Jr.
*Attorney, Agent, or Firm*—Barnes & Thornburg

[57] ABSTRACT

The present device relates to a retainer adapted to retain an arm in a position mounted for pivotable movement on a base, and particularly to a shield retainer for a juvenile seat including a pivotable barrier shield. More particularly, the present device relates to a retainer adapted to retain a pivotable barrier shield arm in a frame of a juvenile car seat.

29 Claims, 4 Drawing Sheets

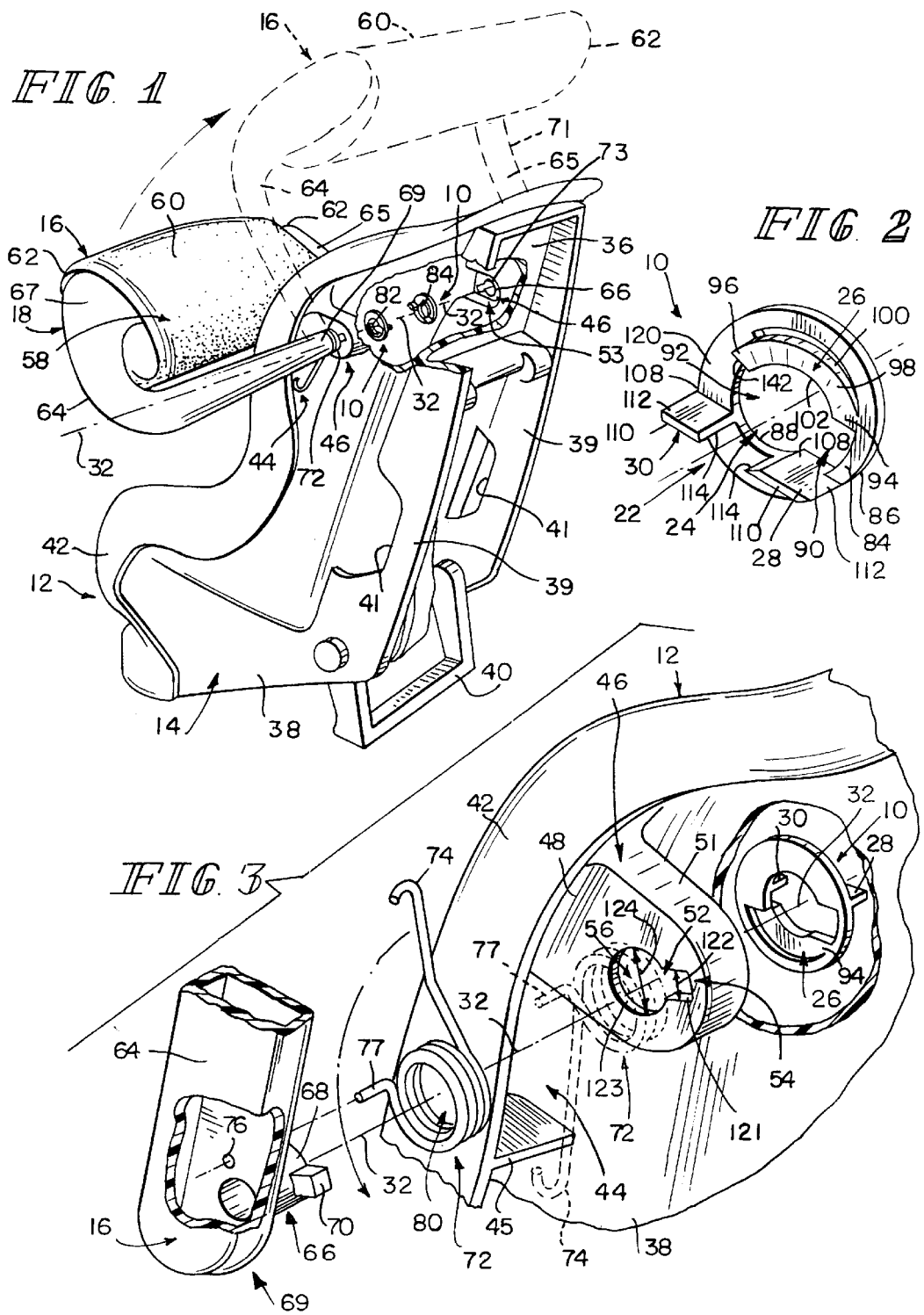

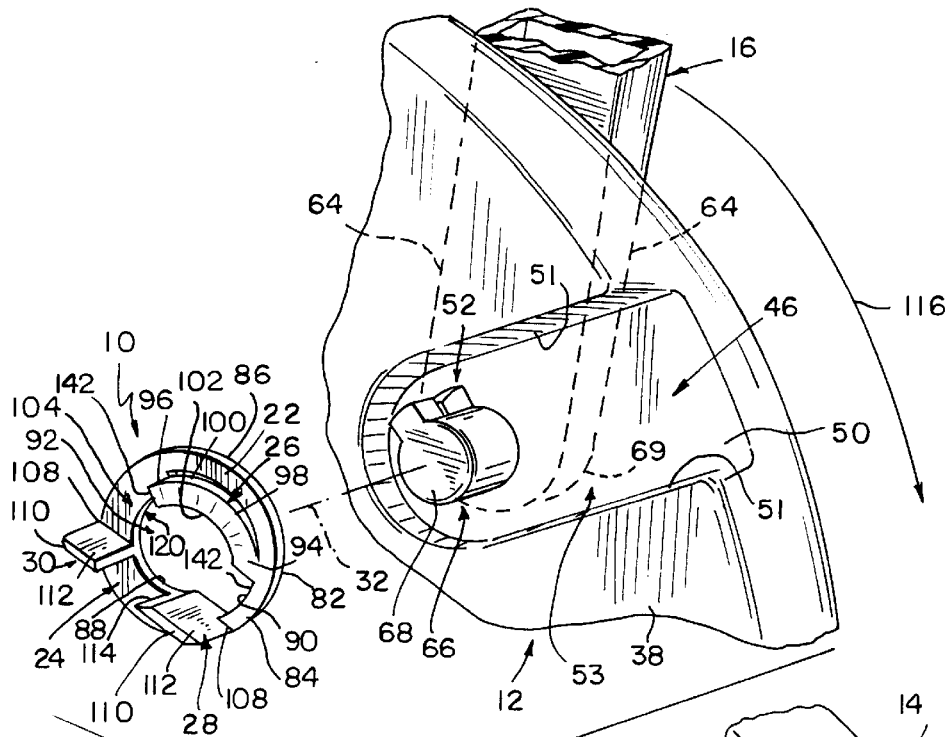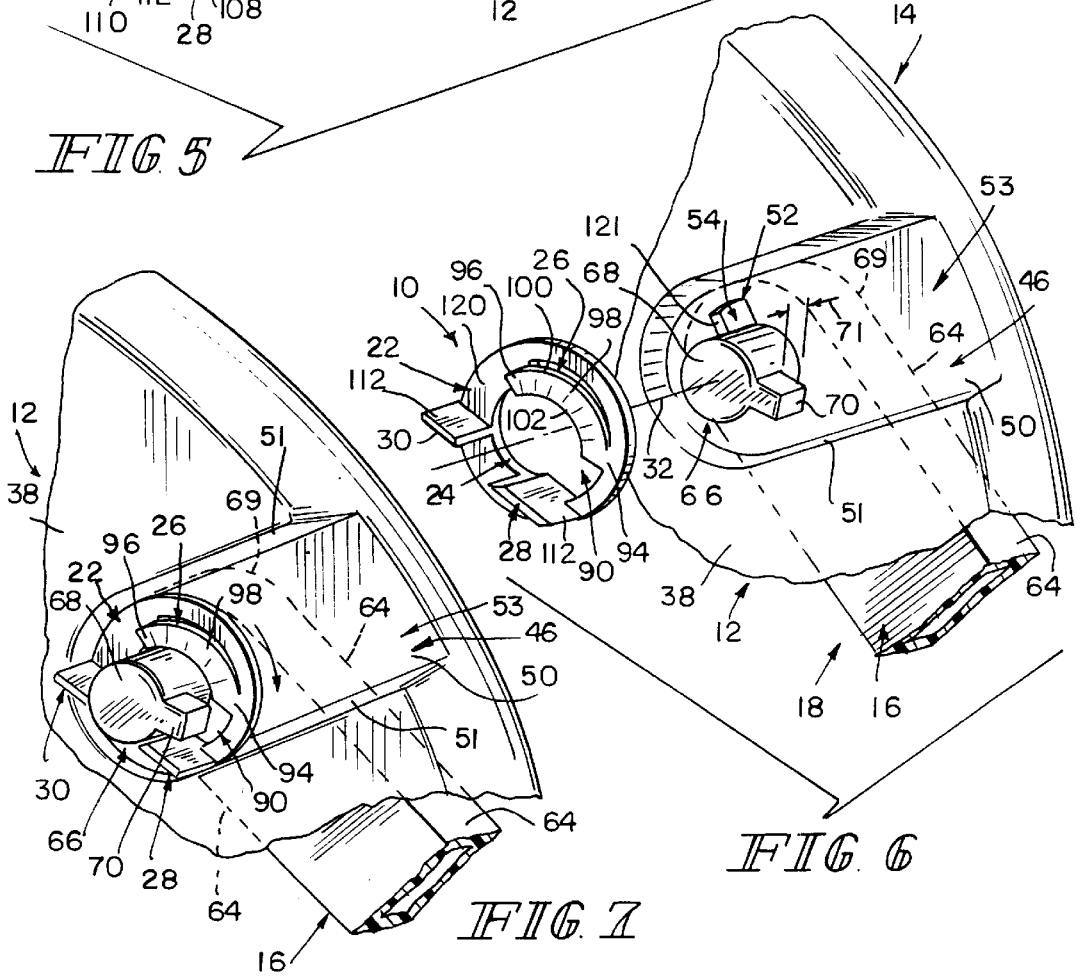

RETAINER

This claims priority under 35 U.S.C. §119(e) of Ser. No. 60/058,542 filed Sep. 11, 1997.

BACKGROUND AND SUMMARY OF THE INVENTION

The present invention relates to a retainer adapted to retain an arm in a position mounted for pivotable movement on a base, and particularly to a shield retainer for a juvenile seat including a pivotable barrier shield. More particularly, the present invention relates to a retainer adapted to retain a pivotable barrier shield arm in a frame of a juvenile car seat.

According to the present invention, a retainer is provided for use with a juvenile car seat that includes a frame and a shield mounted for pivotable movement on the frame. The retainer is adapted to retain the pivotable shield on the frame so that the shield may be pivoted between a lowered position in front of a child seated in the car seat and a raised position above the child.

The frame includes a pair of shield mounts and the shield includes a pair of arms and a barrier coupled to a forward end of each arm. A rear end of each shield arm is pivotably coupled to one of the two shield mounts. The rear end of each arm includes a connector adapted to be coupled to the frame and configured to include a pivot shaft and a flange appended to the pivot shaft. Each retainer extends about one of the pivot shafts and engages an inner surface of the companion shield mount to block movement of the flange through an aperture formed in the shield mount and adapted to receive the pivot shaft therein so as to retain the pivotable arm of the shield on the frame.

In preferred embodiments, the retainer includes a base formed to include an opening therethrough. The base includes a flexible curved tongue that is formed as a ramp and includes stop ribs spaced-apart from the tongue. The tongue cooperates with the base and one of the stop ribs to define a retention portion therebetween. The retention portion traps the flange of the arm therein so that the retainer rotates with the shield about a pivot axis during pivotable movement of the shield between the lowered and raised portions. Thus, the flange is blocked from sliding through the aperture formed in the shield mount to retain the pivotable shield on the frame.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a rear perspective view, with portions broken away, of a juvenile car seat prior to connection of first and second retainers to left and right arms of a pivotable shield, the juvenile car seat including a car seat frame, a movable shield coupled to the frame for pivotable movement about a pivot axis, a first retainer adapted to retain a left arm of the pivotable shield in a mounted position on the frame, and a second retainer adapted to retain a right arm of the pivotable shield in a mounted position on the frame;

FIG. 2 is a perspective view of one of the retainers shown in FIG. 1, the retainer including a circular base, a curved tongue coupled to the right side of the base, two spaced-apart upstanding stop ribs coupled to the left-side of the base, and a keyhole shaped opening having a slender portion and a broad portion arranged to extend through the base and lie between the two stop ribs and the curved tongue;

FIG. 3 is an enlarged exploded perspective view of a portion of the juvenile car seat of FIG. 1 at a point where the left arm of the pivotable shield is to be connected to the juvenile car seat frame, with portions broken away, showing the frame including a side wall having a shield mount formed to include an outer surface, an inner surface, and a key-hole shaped aperture extending between the outer and inner surfaces and having a narrow portion and a wide portion, the retainer being spaced apart from the inner surface of the shield mount and the movable shield arm being spaced apart from the outer surface of the shield mount, a connector included in the shield arm and sized for extension through the aperture to reach and engage the retainer as shown in FIG. 6, and a coiled spring adapted to be positioned to lie between the shield arm and the shield mount as shown in FIG. 1;

FIG. 5 is an enlarged perspective view of a portion of the juvenile car seat of FIG. 4 at a point where the left arm of the pivotable shield is connected to the juvenile car seat frame, showing the connector including a pivot shaft extending through the wide portion of the aperture and a flange extending from the pivot shaft in general alignment with narrow portion of the aperture and the retainer being spaced apart from the inner surface of the shield mount, FIG. 6 is a view similar to FIG. 4 at a point where the left arm of the pivotable shield is rotated to a lowered position where the flange of the connector is spaced-apart from the narrow portion of the aperture, the retainer being spaced apart from the inner surface of the shield mount and the slender portion of the opening being in general alignment with the flange of the connector;

FIG. 7 is an enlarged perspective view similar to FIG. 6 at the point where the connector extends through the opening of the retainer, the retainer engaging the inner surface of the shield mount and the slender portion of the opening being in general alignment with the flange of the connector;

DETAILED DESCRIPTION OF THE DRAWINGS

Figure 4:
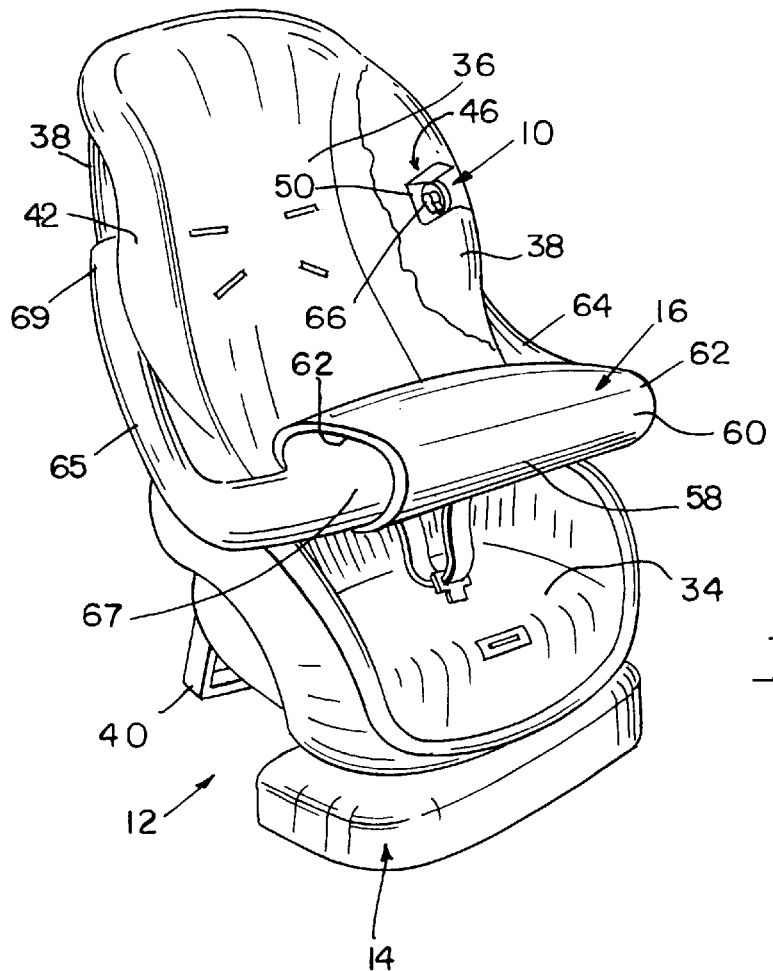
FIG. 4 is a front perspective view of the juvenile car seat assembly of FIG. 1, with portions broken away, at the point where the left arm of the pivotable shield is connected to the juvenile car seat frame, showing the left-side retainer being coupled to the connector of the left arm of the pivotable shield.

As shown in FIG. 1, a juvenile car seat 11 includes a frame 14, a shield 16 mounted for pivotable movement on the frame 14 between a lowered position (shown in solid) in front of a child (not shown) seated in seat 11 and a raised position (shown in phantom) above such a child, and a pair of retainers 10 configured to retain pivotable shield 16 on frame 14 so that shield 16 may be pivoted about pivot axis 32 without disengaging shield 16 from frame 14.

Shield 16 includes a barrier 48, a left arm 64 including a front end 67 appended to barrier 48 and a rear end 69 adapted to be pivotably coupled to frame 14 and retained in place by one of the two retainers 10, and a right arm 65 including a front end 71 appended to barrier 48 and a rear end 73 adapted to be pivotably coupled to frame 14 at and retained in place by the other of the two retainers 10. Shield 16 is made of a plastics material.

As shown in FIG. 1, frame 14 includes a pair of shield mounts 46, and rear end 69 of left arm 64 is pivotably coupled to shield mount 46 while rear end 73 of right arm 65 is pivotably coupled to shield mount 46. Retainers 10 are configured to retain the rear ends 69, 73 of the left and right arms 64, 65 in positions mounted for pivotable movement relative to frame 14. As shown in FIGS. 1 and 3, a spring 72 is configured to couple to rear end 69 of left arm 64 and to engage a portion of frame 14 to yieldably bias shield 16 to its lowered position relative to frame 14. Another spring (not shown) similar to spring 72 is configured to couple to rear end 69 of right arm 65 and engage another portion of frame 14 to assist spring 72 in yieldably biasing shield 16 to its lowered position.

Referring now to FIGS. 1 and 3, retainers 10 are adapted to couple shield 16 to frame 14. Frame 14 is made of a plastics material and includes a seat portion 34, a back portion 36 coupled to seat portion 34, side wall 38 extending between seat and back portions 34, 36, back braces 39 extending along back portion 36, and a seat brace 40 coupled to back braces 39. Each back brace 39 is formed to include a seat belt-receiving slot 41. In addition, each side wall 38 includes a lip 42 that defines a generally U-shaped channel 44 and a shield mount 46 that extends through channel 44 toward back portion 36.

As shown in FIGS. 1 and 4, each shield mount 46 of frame 14 is formed to receive one retainer 10. Shield mount 46 is formed to include an aperture 52 sized to receive a connector 66 provided at rear end 69 of arm 64 as shown, for example, in FIG. 3. Shield 16 is retained on frame 14 by a retainer coupled to connector 66 and shield mount 46.

Shield mount 46 includes an outer surface 48 facing lip 42, an opposite inner surface 50, and side panels 51 that extend from inner surface 50 to define a forward-facing cavity 53 that receives retainer 10 as shown in FIGS. 1, 3, and 4. As shown in FIG. 3, shield mount 46 is formed to include a connector-receiving aperture 52 extending between outer and inner surfaces 48, 50. Aperture 52 is formed in the general shape of a key-hole and includes a narrow portion 54 and a wide portion 56. Narrow portion 54 is defined by generally straight side edges 121 that define a first dimension 122. Wide portion 56 is defined by a generally circular edge 123 that has a second dimension 124 that is greater than first dimension 122.

Barrier 48 of shield 16 has a central portion 60 and opposite ends 62 as shown in FIG. 1. Arms 64, 65 extend from opposite ends 62 as shown in FIG. 1. While only one arm 64 and retainer 10 will be discussed hereafter, the description applies to arm 65 and to each retainer 10. As shown in FIGS. 3–5, arm 64 includes a connector 66 at rear end 69. Connector 66 is adapted to extend through aperture 52 of shield mount 46 into cavity 53 and to mate with retainer 10.

Figure 8:
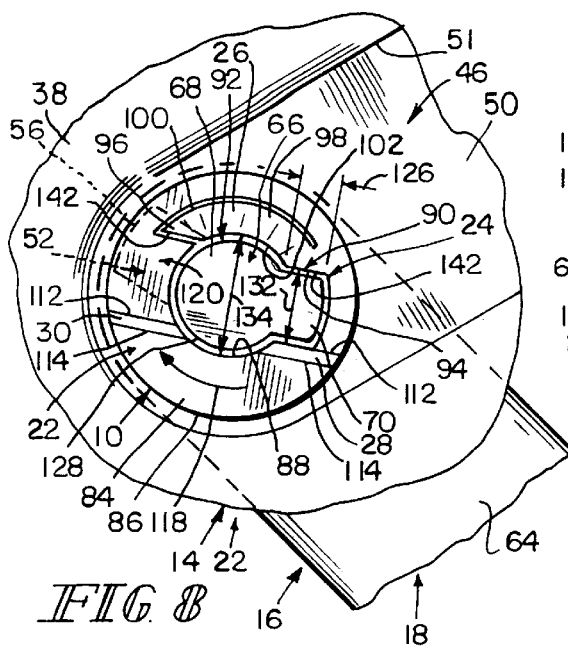
FIG. 8 is a side view of the shield mount of FIG. 7 showing the flange positioned to lie in alignment with the slender portion of the opening adjacent to a fixed end of the tongue.

As shown in FIGS. 5 and 6, connector 66 is configured to couple shield 16 to frame 14 when shield 16 is in the lowered position. Connector 66 includes a pivot shaft 68 sized for extension through wide portion 56 of aperture 52 and a flange 70 extending outwardly from pivot shaft 68. As shown in FIG. 5, flange 70 is adapted to be positioned spaced-apart from inner surface 50 of shield mount 46 a predetermined distance 71. In addition, as shown in FIG. 8, flange 70 extends a predetermined distance 126 from an outer peripheral surface 128 of pivot shaft 68.

Flange 70, as shown again in FIG. 6, is sized to block movement of connector 66 through aperture 52 of shield mount 46 when shield 16 is in the lowered position, situating flange 70 in an off-set position relative to narrow portion 54 of aperture 52. When, however, shield 16 is in a raised position, flange 70 is aligned with narrow portion 57 of aperture 52, as shown in FIG. 5, and connector 66 may slide easily into and out of aperture 52.

As shown in FIGS. 1 and 3, spring 72 normally urges shield 16 relative to frame 14 toward the lowered position. Spring 72 includes a first end 74 formed for extension into channel 44 and engagement with rib 45, an opposite second end 77 coupled in an aperture 76 of arm 64, and a coiled center portion 78 defining a passageway 80. It is within the scope of this disclosure to couple spring 72 to shield mount 46, side wall 38 adjacent to shield mount 46, or to any other suitable location on car seat 12. Connector 66 of arm 64 is sized for extension through passageway 80 of coiled center portion 78 and sandwiches coiled center portion 78 of spring 72 between arm 64 and outer surface 48 of shield mount 46.

Referring now to FIG. 2, retainer 10 includes a base 22 that is generally circular in shape and defines an opening 24 sized to receive connector 66 therethrough. Base 22 also includes a tongue 26 formed as a ramp extending from base 22 and stop ribs 28, 30 spaced-apart from tongue 26. Base 22 is formed to rest against inner surface 50 of shield mount 46 as shown in FIG. 7. Tongue 26, base 22, and stop rib 30 cooperate to trap flange 70 of connector 66 therebetween so that retainer 10 will rotate with shield 16 about pivot axis 32 during pivoting movement of shield 16 between the lowered and raised positions relative to frame 14.

As shown in FIGS. 7–12 retainer 10 is coupled to connector 66 and base of retainer 10 is sandwiched between flange 70 and inner surface 50 of shield mount 46. Retainer 10 is coupled to connector 66 so as to rotate with shield 16 on frame 14 as central portion 60 pivots between the raised position and the lowered position as shown in FIG. 1. Retainer 10 is made of an injection-molded plastics material.

Figure 9:
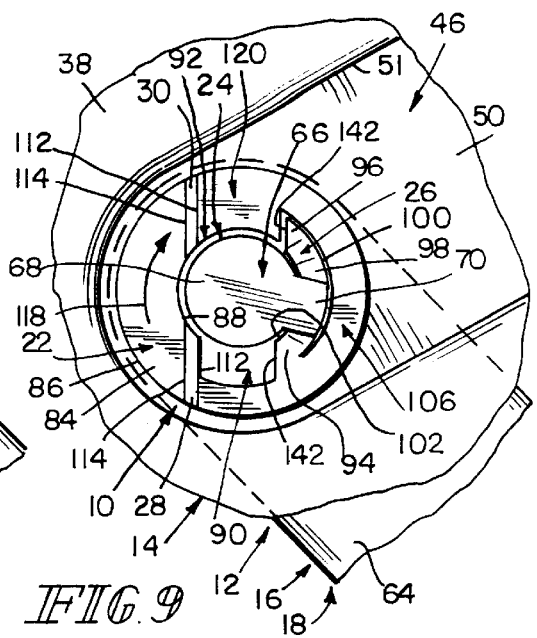
FIG. 9 is a view similar to FIG. 8 at a point where the retainer is rotated in a clock-wise direction and the flange of the connector yieldably presses the tongue toward the inner surface of the shield mount.

Referring now to FIGS. 5–7, base 22 of retainer 10 is configured to be coupled between flange 70 and inner surface 50 of shield mount 46 to block movement of pivot shaft 68 through aperture 52, even when flange 70 is aligned with narrow portion 54 of aperture 52. Base 22 of retainer 10 further includes an inner side 82 configured to face inner surface 50 of shield mount 46, an outer side 84, an outer edge 86 extending about the periphery of base 22, and an opposite inner edge 88. As shown in FIG. 9, base 22 has a pre-determined base dimension 130 that is greater than second dimension 124 of aperture 52 (FIG. 3). Referring again to FIGS. 6 and 7, opening 24 includes a slender portion 90 configured to receive flange 70 and a broad portion 92 configured to receive pivot shaft 68 therethrough. It is contemplated that the shape and relative positioning, as well as the size of opening 24 may be varied to correspond in shape to aperture 52 and connector 66 as previously discussed.

Tongue 26 of retainer 10 is generally semi-circular in shape and includes a fixed end 94 coupled to base 22 and an opposite free end 96. Fixed and free ends 94, 96 are spaced-apart from one another and each includes an end portion 142 that is positioned to lie in a generally linear relationship relative to one another. A middle ramped portion 98 extends between fixed and free ends 94, 96. As best shown in FIGS. 5–7, fixed end 94 cooperates with first stop rib 28 to define slender portion 90 of opening 24 having a slender portion dimension 132. Ramped portion 98 includes a radially outer edge 100 and a radially inner edge 102 that cooperates with inner edge 88 to define broad portion 92 of opening 24 having a broad portion dimension 134 that is greater than slender portion dimension 32.

As shown in FIG. 5, ramped portion 98 normally flexes away from base 22 to position free end 96 in a normal elevated position spaced-apart from base 22. Given the flexibility of tongue 126, ramped portion 98 and free end 96 yieldably deflect to a generally flat position 106 as shown in FIG. 9, adjacent to base 22 when pressed by flange 70 as will be discussed hereafter.

Referring again to FIG. 5, first and second stop ribs 28, 30, of retainer 10 are generally rectangular in shape and include a fixed end 108 coupled to outer surface 84 of base 22, an opposite free end 110, an engagement surface 112 facing opening 24, and an opposite second surface 114. Stop ribs 28, 30 are positioned to lie in a generally linear relationship relative to one another on base 22 in general alignment with fixed and free ends 94, 96 respectively of tongue 26. Engagement surface 112 of second stop rib 30 cooperates with outer surface 84 of base 22 and end portion 142 of free end 96 to define a flange-retention portion 120. Flange-retention portion 120 traps flange 70 on base 22 in a position spaced-apart from slender portion 90 to prevent flange 70 from rotating back into alignment with slender portion 90. First stop rib 28 provides a grip for a car seat assembly worker and prevents flange 70 from rotating over outer surface 84 of base 22 opposite tongue 26 during car seat assembly.

In order to assemble car seat 12, an assembly worker illustratively grasps shield 16 and passes connector 66 through passageway 80 of spring 72. As shown in FIG. 3, the worker presses first end 74 of spring 72 about rib 45 in channel 46 and second end 77 into aperture 76 in arm 64. Flange 70 of connector 66 is then aligned with narrow portion 54 of aperture 52 in shield mount 46 and connector 66 is pushed through aperture 52 bayonet-style, until flange 70 is spaced-apart from inner surface 50 of shield mount 46, as shown in FIG. 5. Second arm 64 is coupled to opposite side wall 38 in a like manner. At this time, shield 16 is rotated as shown by arrow 116 to the lowered position, so that flange 70 is spaced-apart from narrow portion 54 of aperture 52, blocking removal of connector 66 from aperture 52. Thus, shield 16 is retained temporarily on frame 14, so long as shield 16 is positioned in the lowered position.

To retain shield 16 on frame 14, regardless of whether shield 16 is in the lowered or raised positions, the worker first grasps base 22 of retainer 10 and aligns slender portion 90 of opening 24 with flange 70 of connector 66, as shown in FIG. 6. Once aligned, the worker simply extends retainer 10 over pivot shaft 68 of connector 66, until inner surface 82 of base 22 engages inner surface 50 of shield mount 46, as shown in FIGS. 7 and 8.

Figure 10:
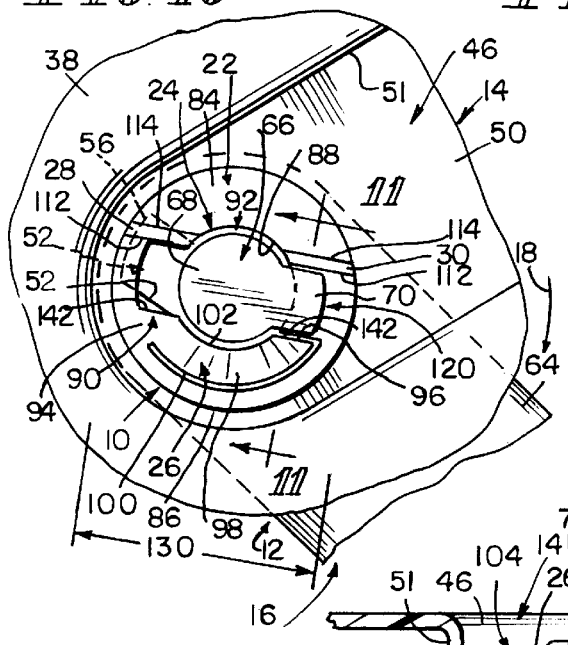
FIG. 10 is a view similar to FIG. 9 at a point where the retainer is rotated in the clock-wise direction past the tongue trapping the flange of the connector within a flange-retention portion defined by the base, the tongue and a stop rib to couple the left arm of the shield on the juvenile car seat.
Figure 12:
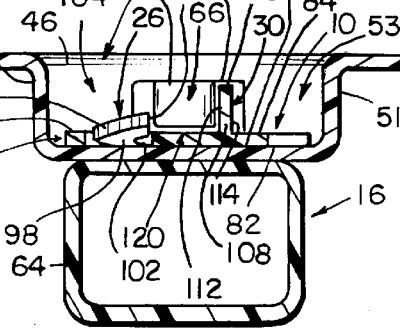
FIG. 12 is a cross-sectional view taken along lines 12—12 of FIG. 10 showing the relative positioning of the shield, the base, and the retainer when the flange is confined in the flange-retention portion.

It is now simple to couple retainer 10 and shield 16 to frame 14. The worker must only rotate base 22 in a clockwise direction, as shown by arrow 118, in FIG. 8, relative to connector 66 until flange 70 is trapped within flange-retention portion 120. As shown in FIG. 9, rotation 118 of base 22 causes ramped portion 98 of tongue 26 to move toward shield mount 46 and generally flat position 106. Tongue 26 remains in generally flat position 106 as flange 70 passes over ramped portion 98 and until flange 70 is situated in flange-retention portion 120, as shown in FIG. 10. Referring now to FIG. 12, once flange 70 has passed over ramped portion 98, tongue 26 returns to its normal elevated portion and flange 70 is trapped in flange-retention portion 120 on outer surface 84 of base 22 between second stop rib 30 and free end 96 of tongue 26.

Figure 11:
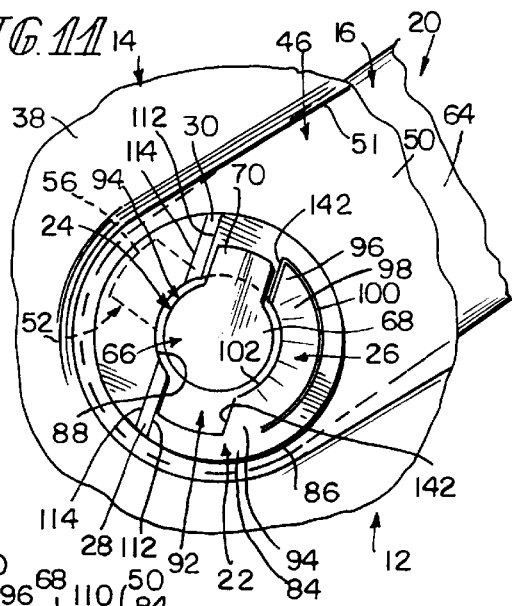
FIG. 11 is view similar to FIG. 10 at a point where the left arm of the pivotable shield is rotated toward a raised position showing rotation of the connector causing corresponding rotation of the retainer.

As shown in FIG. 11, once coupled to shield 16, retainer 10 rotates with connector 66 as shield 16 is pivoted to the raised position, at all times preventing connector 66 from exiting aperture 52. Thus, flange 70 is prevented from sliding through opening 24 in retainer 10 as well as aperture 54 in side wall 38, thus coupling shield 16 on car seat 12. Retainer 10 will remain in place on arm 64 until tongue 26 is depressed manually toward shield mount 46 and retainer 10 is rotated in a counterclockwise direction (not shown) under flange 70 to align flange 70 with slender portion 90 opening 24.

Figures 13, 14:
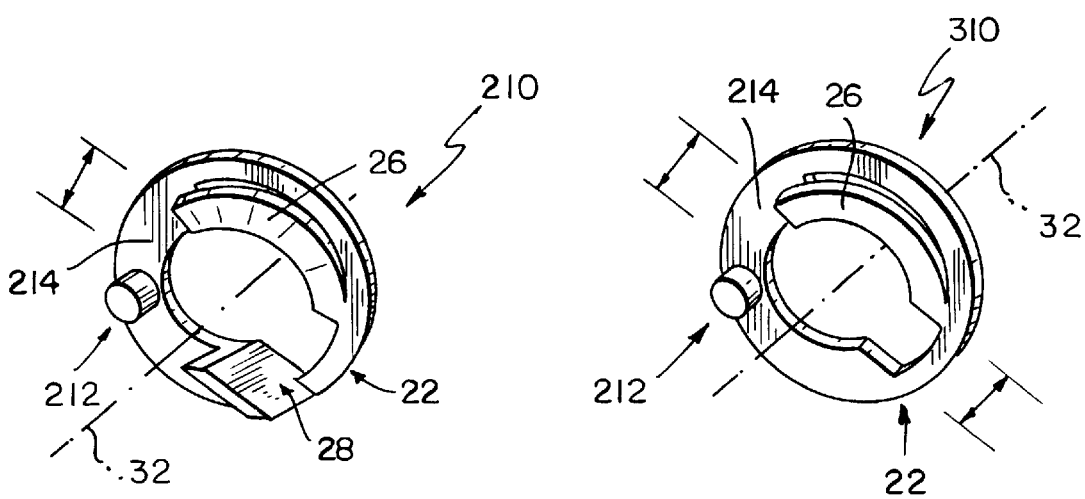
FIGS. 13 and 14 are perspective views of alternative embodiments of a retainer in accordance with the present invention.

As shown in FIG. 13, retainer 210 is similar to retainer 10 and like reference numerals will be used to denote like components. Retainer 210 includes a post 212 extending away from base 22 in a spaced-apart relationship to flexible tongue 26. Post 212 cooperates with base 22 and tongue 26 to define a flange-retention portion 214 therebetween. Flange-retention portion 214 operates in a similar manner to flange-retention portion 120 as previously described to enable retainer 210 to retain shield 16 on frame 14. Retainer 310 is similar to retainer 210 except that retainer 310 does not include the stop rib 28 that is included in retainer 210.

Retainers 10, 210, 310 provide ease of assembly, as it is positive in its placement. In addition, retainers 10, 210, 310 absorb differences in surface shape and lateral tolerance buildup while maintaining an ability to retain shield 16 and to add to the friction of lifting shield 16 relative to frame 14 of car seat 12. Retainers 10, 210, 310 retain shield 16 on frame 14 in a manner that permits movement of shield 16 between a lowered position and a raised position without the need for a multi-part connection apparatus that includes nuts, bolts, or other fasteners. While retainer 10, 210, 310 was described above with reference to juvenile car seat 12, it is within the scope of this disclosure to use retainer 10, 210 to couple a shield on any number of seats and a wide variety of movable members on a wide variety of frames.

Although the invention has been described in detail with reference to preferred embodiments, variations and modifications exist within the scope and spirit of the invention as described and defined in the following claims.

What is claimed is:

1. A seat assembly comprising
   a seat including a frame formed to include an aperture,
   an arm including a connector extending through the aperture, a retainer including a base defining an opening receiving the connector therein and permitting rotation of the base about the connector, a tongue coupled to the base, and a stop rib coupled to the base and positioned to lie in spaced-apart relation from the tongue, the stop rib cooperating with the tongue and the base to form a retention portion that traps the connector on the base to couple the retainer between a portion of the arm and the seat.

2. The seat assembly of claim 1, wherein the base includes an inner edge that cooperates with the tongue to define a broad portion of the opening.

3. The seat assembly of claim 2, wherein the tongue includes a fixed end coupled to the base, an opposite free end, a radially outer surface, and an opposite radially inner surface extending between the fixed and free ends and the radially inner surface cooperates with the base to define the broad portion.

4. The seat assembly of claim 2, further comprising a second stop rib coupled to the base.

5. The seat assembly of claim 4, wherein the tongue includes a fixed end coupled to the base and an opposite free end and the second stop rib includes an engagement surface facing the fixed end of the tongue.

6. The seat assembly of claim 4, wherein the tongue includes a fixed end coupled to the base and an opposite free end and the second stop rib and the fixed end of the tongue define a slender portion of the opening.

7. The seat assembly of claim 6, wherein the slender portion of the opening is spaced-apart from the retention portion.

8. The seat assembly of claim 4, wherein the first and second stop ribs are positioned to lie in a generally linear relationship relative to one another.

9. The seat assembly of claim 1, further comprising a second stop rib coupled to the base.

10. The seat assembly of claim 9, wherein the base is substantially circular.

11. The seat assembly of claim 9, wherein the tongue includes a fixed end coupled to the base, an opposite free end, a radially outer surface, and an opposite radially inner surface extending between the fixed and free ends and the radially inner surface cooperates with the base to define a broad portion of the opening.

12. The seat assembly of claim 11, wherein the second stop rib and the fixed end cooperate to define a slender portion of the opening.

13. A juvenile seat assembly comprising
a juvenile seat including a frame having a wall and an aperture through the wall,
a movable shield including a connector extending through the aperture, the connector including a pivot shaft and a flange extending from the pivot shaft,
a retainer including a base defining an opening receiving the connector therethrough, a tongue coupled to the base, and a stop rib coupled to the base and positioned to lie in spaced-apart relation from the tongue, the stop rib, tongue, and base cooperating to form a flange-retention portion therebetween that receives the flange to couple the base between the flange and the wall to block movement of the connector through the aperture of the frame.

14. The assembly of claim 13, wherein the tongue includes a fixed end coupled to the base, a free end, and a ramped portion extending between the fixed and free ends.

15. The assembly of claim 14, wherein base includes an inner end facing the frame and an opposite outer end and the opening extends between the inner and outer ends.

16. The assembly of claim 15, wherein the tongue includes a fixed end coupled to the base and an opposite free end and the free end of the tongue is positioned normally to lie spaced-apart from the outer surface of the base.

17. The assembly of claim 16, wherein the free end of the tongue cooperates with the base and the stop rib to define the flange-retention portion.

18. The assembly of claim 16, wherein the flange is formed to engage the tongue and yieldably press the ramped portion toward the frame upon rotation of the base about the pivot shaft to move the flange from adjacent to the fixed end to adjacent to the free end of the tongue.

19. The assembly of claim 14, wherein the ramped portion of the tongue cooperates with the base to define a broad portion of the opening receiving the pivot shaft therethrough.

20. The assembly of claim 19, wherein the retainer includes a second stop rib positioned to lie spaced apart from the first stop rib.

21. The assembly of claim 20, wherein the fixed end of the tongue cooperates with the second stop rib to define a slender portion of the opening that is sized to receive the flange therethrough.

22. The assembly of claim 21, wherein the flange-retention portion is spaced apart from the slender portion of the opening.

23. A juvenile seat assembly comprising
a juvenile seat including a frame having a wall and an aperture through the wall,
a movable shield including a barrier and an arm extending from the barrier, the arm including a connector extending through the aperture, the connector including a pivot shaft and a flange extending from the pivot shaft, and
a retainer including a base having an inner edge, a flexible tongue cooperating with the inner edge to define an opening receiving the connector therethrough, and a stop rib extending outwardly from the base, the flexible tongue having a fixed end coupled to the base and an opposite free end normally spaced-apart from the base, the fixed end cooperating with the stop rib and the base to form a flange-retention portion configured to trap the flange therein to block movement of the pivot shaft through the aperture of the frame and couple the shield on the frame.

24. The assembly of claim 23, wherein the fixed end of the tongue cooperates with the inner edge to define a slender portion of the opening that receives the flange of the connector therethrough.

25. The assembly of claim 24, wherein the tongue includes a ramped portion extending between the fixed and free ends and the ramped portion cooperates with the inner edge of the base to define a broad portion of the opening that receives the pivot shaft of the connector therethrough.

26. The assembly of claim 25, wherein the flange is formed to engage the ramped portion during rotation of the base about the pivot shaft to press the ramped portion toward the frame and permit movement of the flange across the tongue from the slender portion of the opening to the flange-retention portion.

27. The assembly of claim 23, wherein the tongue includes a ramped portion extending between the fixed and free ends and the ramped portion cooperates with the inner edge of the base to define a broad portion of the opening that receives the pivot shaft of the connector therethrough.

28. The assembly of claim 27, wherein the flange is formed to engage the ramped portion during rotation of the base about the pivot shaft to press the ramped portion toward the frame and permit movement of the flange across the tongue from a position adjacent to the fixed end to the flange-retention portion.

29. A method for coupling a movable shield to a frame, the method comprising the steps of providing a frame formed to include an aperture, providing a shield including an arm including a pivot shaft and a flange extending outwardly from the pivot shaft, providing a retainer including a base formed to include an opening, a tongue coupled to the base, and a stop rib spaced-apart from the tongue, the stop rib, tongue, and base cooperating to define a flange-retention portion therebetween, positioning the shield on the frame so that the pivot shaft extends through the aperture formed in the frame to establish a pivotable connection between the shield and the frame, positioning the retainer on the shield so that the base rests against the frame and the pivot shaft extends through the opening, and rotating the base about the pivot shaft until the flange passes across the tongue and moves into the flange-retention portion to block movement of the pivot shaft through the opening formed in the retainer and aperture formed in the frame.

* * * * *